(12) United States Patent
Jones (10) Patent No.: US 6,400,309 B1
(45) Date of Patent: Jun. 4, 2002

(54) DOPPLER-BASED TRAFFIC RADAR SYSTEM AND RELATED METHOD OF OPERATION WITHOUT DETECTION

(75) Inventor: David W. Jones, Beaver Dam, KY (US)

(73) Assignee: MPH Industries, Inc., Owensboro, KY (US)

(*) Notice: Subject to any disclaimer, the term of this patent is extended or adjusted under 35 U.S.C. 154(b) by 11 days.

(21) Appl. No.: 09/583,054

(22) Filed: May 30, 2000

Related U.S. Application Data (60) Provisional application No. 60/159,631, filed on Oct. 15, 1999.

(51) Int. Cl.⁷ .............................................. G01S 13/08
(52) U.S. Cl. ........................................................ 342/104
(58) Field of Search ................................. 342/104, 115, 342/117, 16

(56) References Cited

U.S. PATENT DOCUMENTS

| | | | |
|---|---|---|---|
| 3,731,307 A | 5/1973 | Charlot, Jr. | |
| 3,798,643 A | 3/1974 | Blore | |
| 4,126,862 A | 11/1978 | Simonaire | |
| 4,315,261 A | * 2/1982 | Mosher | 342/20 |
| 4,320,397 A | 3/1982 | Constantinides | |
| 4,450,445 A | 5/1984 | Conner, Jr. et al. | |
| 4,551,722 A | 11/1985 | Tsuda | |
| 4,642,641 A | 2/1987 | Campbell | |
| 4,646,098 A | 2/1987 | Mattern et al. | |
| 4,730,189 A | 3/1988 | Siegel et al. | |
| 4,731,612 A | 3/1988 | Chalard et al. | |
| 5,087,917 A | 2/1992 | Fujisaka | |
| 5,095,312 A | 3/1992 | Jehle et al. | |
| 5,109,231 A | 4/1992 | Olsson | |
| 5,291,202 A | 3/1994 | McClintock | |
| 5,504,488 A | 4/1996 | Henerson et al. | |
| 5,525,996 A | 6/1996 | Aker et al. | |
| 5,528,245 A | 6/1996 | Aker et al. | |
| 5,528,246 A | 6/1996 | Henderson et al. | |
| 5,563,603 A | 10/1996 | Aker et al. | |
| 5,565,871 A | 10/1996 | Aker et al. | |
| 5,570,093 A | 10/1996 | Aker et al. | |
| 5,691,724 A | 11/1997 | Aker et al. | |
| 5,777,575 A | 7/1998 | Shelton et al. | |
| 6,023,236 A | 2/2000 | Shelton | |
| 6,198,427 B1 | 3/2001 | Aker et al. | |

OTHER PUBLICATIONS

Phantom Radar Gun, 1999, Astro Products webpage, pp. 1–4.*
The Stalker DSR, 2001, Stalker Radar webpge, pp. 1–2.*

* cited by examiner

Primary Examiner—Daniel T. Pihulic
(74) Attorney, Agent, or Firm—King and Schickli, PLLC (57) ABSTRACT

A Doppler-based traffic radar system determines a speed of a moving target from a platform while substantially eliminating the possibility of detection by an operator of the moving target utilizing a traffic radar detector. The radar system limits a period of time the system is initially transmitting. The radar system is adapted to determine the speed of the target and display the speed. Dependent upon the displayed rate of speed, the radar system operator further has the ability to halt operation of the radar system with respect to the particular target or to reinitiate transmission of the transmit signal for subsequently tracking the speed of the moving target.

26 Claims, 6 Drawing Sheets

DOPPLER-BASED TRAFFIC RADAR SYSTEM AND RELATED METHOD OF OPERATION WITHOUT DETECTION

This application claims the benefit of U.S. Provisional Application 60/159,631, filed Oct. 15, 1999.

TECHNICAL FIELD

The present invention relates generally to a Doppler-based traffic radar system and, more particularly to such a system and related method for determining the speed of a target without detection by an operator of the target or subsequent targets utilizing a traffic radar detector.

BACKGROUND OF THE INVENTION

Law enforcement officers have utilized Doppler-based traffic radar systems to monitor vehicle speeds and enforce traffic speed limit laws for many years. Throughout this period of time, numerous improvements in both the underlying technology and in the specific application of new processing techniques for the traffic radar systems themselves, have afforded law enforcement officers greater flexibility and improved reliability in carrying out their duties. One such improvement evident in most traffic radar systems presently being marketed includes the capability to more accurately and reliably monitor the speed of certain vehicles while the patrol vehicle is either in a stationary or a moving mode of operation. In fact, the recent traffic radar systems can now successfully monitor the speed of vehicles approaching the moving patrol vehicle in an opposite lane.

In addition to these capabilities, such radar systems also provide the law enforcement officer the capability to monitor a group of target vehicles simultaneously and to determine the fastest vehicle within the group and/or the vehicle presenting the traditional strongest reflected return signal. Each of these new or improved existing capabilities provide the law enforcement officer with a more complete picture of the traffic environment and thus, a more flexible and reliable basis for making more informed decisions.

Despite all the improvements in both the underlying technology utilized in these traffic radar systems and the radar systems themselves, drivers who elect to drive at a speed above the legal speed limit are still able to significantly reduce the possibility that their illegal activity will be detected by a traffic radar-system by purchasing one of several commercially available traffic radar detectors. Typical traffic radar detectors are known in the art including those manufactured by such companies as Uniden America Corporation and Cobra Electronics Corporation, among others. These radar detectors are similarly technically advanced and have enjoyed tremendous commercial success as evidenced by the number of sales made to the public.

In an attempt to limit the effectiveness of these radar detectors, most traffic radar systems are capable of operation in both a continuous transmit mode and an intermittent transmit mode. In the intermittent transmit mode, the operator manually triggers the radar system dependent upon several conditions including for example, the number of approaching vehicles or perhaps an initial visual determination of the speed of a single approaching vehicle.

While this intermittent mode of operating traffic radar systems has limited the ability of commercial radar detectors to detect their presence in some scenarios, many scenarios remain in which the radar detectors remain effective. For example, intermittent operation of radar systems in monitored zones having heavy traffic patterns or continuous light traffic patterns may trigger alert signals from a radar detector which are sufficient to allow an alert and cautious driver in and/or approaching the monitored zone to discern the presence and operation of the radar system, thus avoiding detection.

Thus, while traffic radar systems are capable of a high degree of accuracy with regard to vehicle speed measurements, they are subject to detection by commercial radar detectors and thus vehicle operators who elect to speed are often able to avoid detection. Accordingly, a need is clearly identified for a traffic radar system and related methods of operating such systems which are capable of determining the actual speed of a target vehicle while substantially eliminating the possibility of detection by an operator of the target utilizing a radar detector system.

Necessarily, such a radar system and related methods would substantially eliminate the ability of vehicle operators to rely on radar detectors in furtherance of their illegal activities. Accordingly, such a system would significantly increase their risk of being detected while reducing the benefit of owning a radar detector to a point where the number of individuals willing to accept the risks associated with driving at a rate of speed above the legal speed limit is significantly reduced.

SUMMARY OF THE INVENTION

In accordance with the purposes and objectives of the present invention, a novel and improved Doppler-based traffic radar system is provided that is adapted to control the period of time or to limit the duration of an initial transmission of microwave energy or radar signal from the radar system toward a moving target. By limiting the duration of the initial transmission period, presently available commercial radar detectors are substantially unable to detect and/or elect not to report the presence of the radar signal. Accordingly, the traffic radar system is capable of determining the speed of a target while substantially eliminating the possibility of detection by an operator of the target utilizing a traffic radar detector.

In order to limit the duration of the initial transmission period, the radar system of the present invention monitors the amount of the microwave energy or radar signal portion reflected from the moving target. Upon receiving a sufficient amount of the reflected return signal to determine the speed of the target, the radar system ends the initial transmission. Alternatively, the radar system may simply end the initial transmission following a limited period of time.

Once the reflected return signal is obtained, the radar system calculates and displays the speed of the moving target. Dependent upon the speed of the target, the radar system operator has the ability to discontinue the monitoring of the speed of the target or to reinitiate the transmission of microwave energy or radar signal for subsequently calculating the speed of the target and tracking the speed both visually and aurally for a period of time sufficient to support a citation.

In accordance with an important aspect of the present invention, the traffic radar system may be operated from a stationary or a moving platform. During operation from a moving platform, the radar system determines the speed of the platform for calculating the speed of the moving target utilizing a portion of the return signal reflected from a stationary object in a manner well known in the art. Alternatively, a second antenna transmitting the radar signal away from the target may be used to determine the speed of the target.

The following description shows and describes a preferred embodiment of this invention simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENTS

Figure 1:
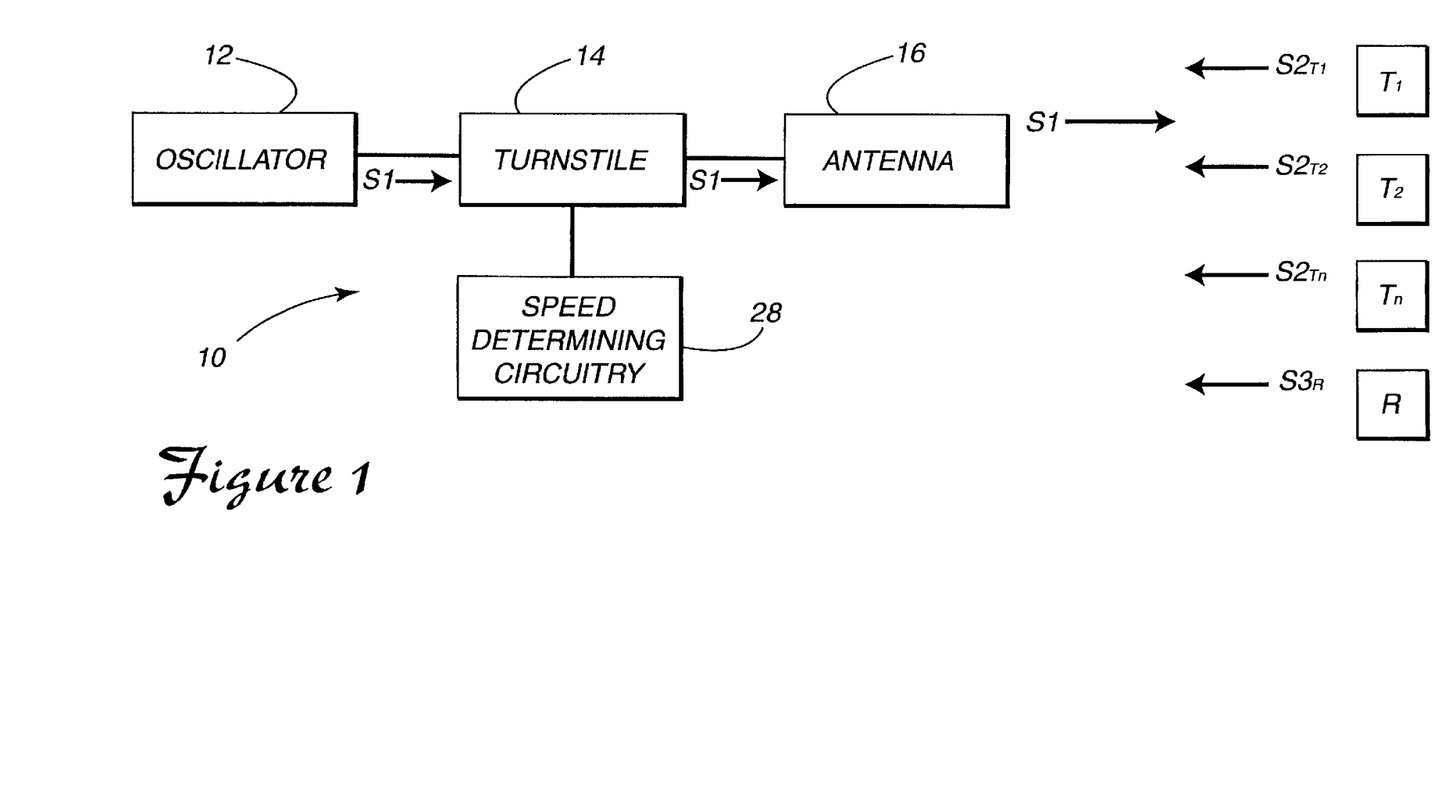
FIG. 1 is an overall schematic block diagram of the Doppler-based radar system of the present invention.

With reference now to the schematic block diagram of FIG. 1, there is shown a present preferred embodiment of a Doppler-based traffic radar system 10 for use in determining the speed of moving targets $T_1, T_2, \ldots T_n$. More specifically, the radar system 10 of the present invention is adapted to control the period of time or to limit the duration of an initial transmission of microwave energy or radar signal $S_1$ from the radar system 10 toward at least one moving target $T_1, T_2 \ldots T_n$ including a selected moving target $T_1$. By limiting the duration of the initial radar signal transmission period, presently available commercial radar detectors are substantially unable to detect, or elect not to report, the presence of the radar signal S1. Accordingly, the radar system 10 is able to determine the speed of the selected moving target $T_1$ while substantially eliminating the possibility of detection by an operator of the target $T_1$ utilizing a traffic radar detector.

In order to be useful to radar detector operators, commercial traffic radar detectors must be designed to discern miscellaneous microwave signals received from devices such as burglar alarms and garage door openers, among others allowed to operate within the frequency ranges allocated to the operation of traffic radar systems (e.g., X band, K band, and Ka band), from traffic radar signals, and to effectively filter out these undesired signals. The ability of commercial radar detectors to discern one signal type from another is directly related to the duration of the signal and varies from one manufacturer's brand of radar detector to the next based for the most part on individual manufacturer preferences.

In other words, some radar detectors are designed to be more sensitive than others, thus potentially triggering a larger number of false alarm signals than a competing radar detector. In realizing these design preferences, the designers of these radar detectors must balance the desired level of sensitivity of the radar detector against the tolerance of radar detector operators for false signals. A radar detector that triggers an alarm each time a miscellaneous or false signal is received is practically useless to the radar detector operator. In accordance with an important aspect of the present invention, the minimum time period $P_1$ required to receive a portion of the radar signal reflected from the moving target $T_1$ sufficient to support the determination or calculation of the speed of the target $T_1$ is short enough in duration (shown as $P_1$ in FIG. 2) to be substantially undetectable or judged to simply be insignificant or miscellaneous microwave energy noise by these radar detectors and not reported to the operator.

Figure 2:
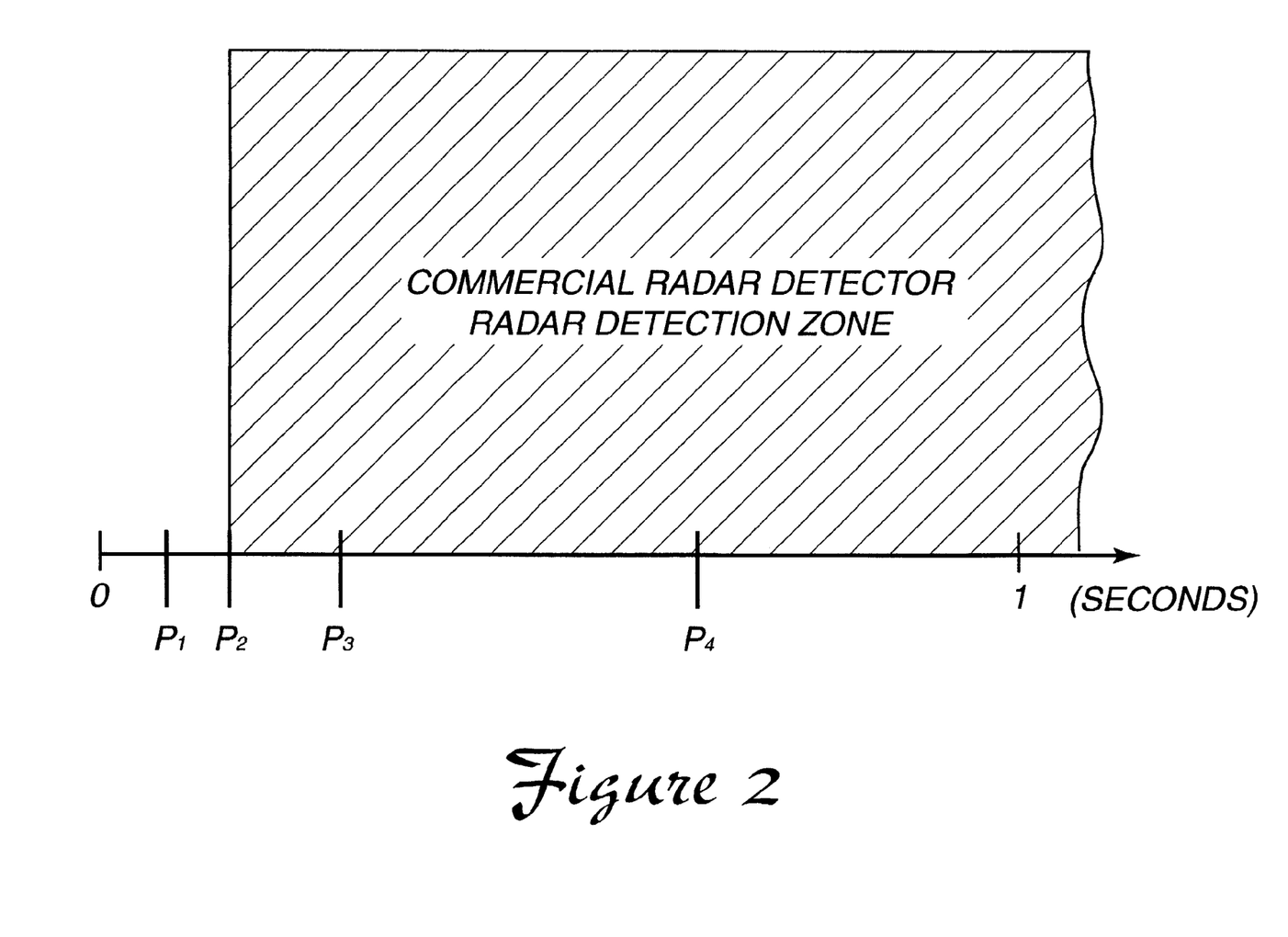
FIG. 2 is a comparative illustration of three distinct transmission periods versus the ability of presently available radar detectors.

As shown in the timeline of FIG. 2, the detection zone of commercial radar detectors wherein traffic radar signals are detected and reported varies from manufacturer to manufacturer and from a minimum time period $P_2$ of approximately twenty-five milliseconds to possibly more than one second. Heretofore, this minimum time period $P_2$ has been sufficient to allow detection of nearly all traffic radar signals having a manually controlled transmission period, i.e., radar signals initiated by an operator of the radar system manually activating a momentary switch and subsequently releasing the momentary switch. As further shown in FIG. 2, the minimum time period required for this type of manual activation of a radar system sufficient to transmit a radar signal and receive a return signal indicative of target speed is indicated as $P_3$ and is approximately fifty milliseconds. Further, the minimum time period required to receive a return signal and a visual indication of the calculated target speed prior to releasing the momentary switch to end the transmission period is indicated as $P_4$ and is approximately two hundred and fifty milliseconds. These time periods $P_3$ and $P_4$ as determined through experimentation are clearly within the noted radar detection zone and provide the radar detector and the radar detector operator with a good indication of the presence of a traffic radar signal.

As best shown in FIG. 1, the radar system 10 includes a conventional Gunn diode oscillator 12 to generate a constant wave radar signal S1. The radar or oscillator signal S1 is passed through a turnstile 14 to an antenna 16. In the present preferred embodiment, the antenna 16 is a circularly polarized horn antenna having a half-power beam width of twelve (12) degrees in azimuth and elevation. The antenna 16 forms a transmitter to transmit the radar signal S1 toward the moving targets $T_1, T_2, \ldots T_n$ and a receiver to receive the reflected portion of the radar signals or return signals $S2_{T1}$, $S2_{T2}, \ldots S2_{Tn}$. The reflected radar signal $S2_{T1}$, for example, is indicative of the speed of the selected target $T_1$. Although the radar system 10 is capable of monitoring several targets, the remainder of the detailed description will assume only one moving target $T_1$ to be present.

In accordance with well known Doppler principles, if the target $T_1$ is moving toward or away from the antenna, the frequency (fr) of the transmitted radar signal S1 is shifted (fr±d) upon contacting the target $T_1$, thus forming the reflected radar signal $S2_{T1}$ in accordance with the speed of the target. The transmitted radar signal S1 is similarly reflected by stationary objects or the roadway R forming a second reflected radar signal $S3_R$. This second reflected signal is indicative of the speed of the platform or law enforcement vehicle supporting the radar system 10 when the platform is moving.

Figure 3:
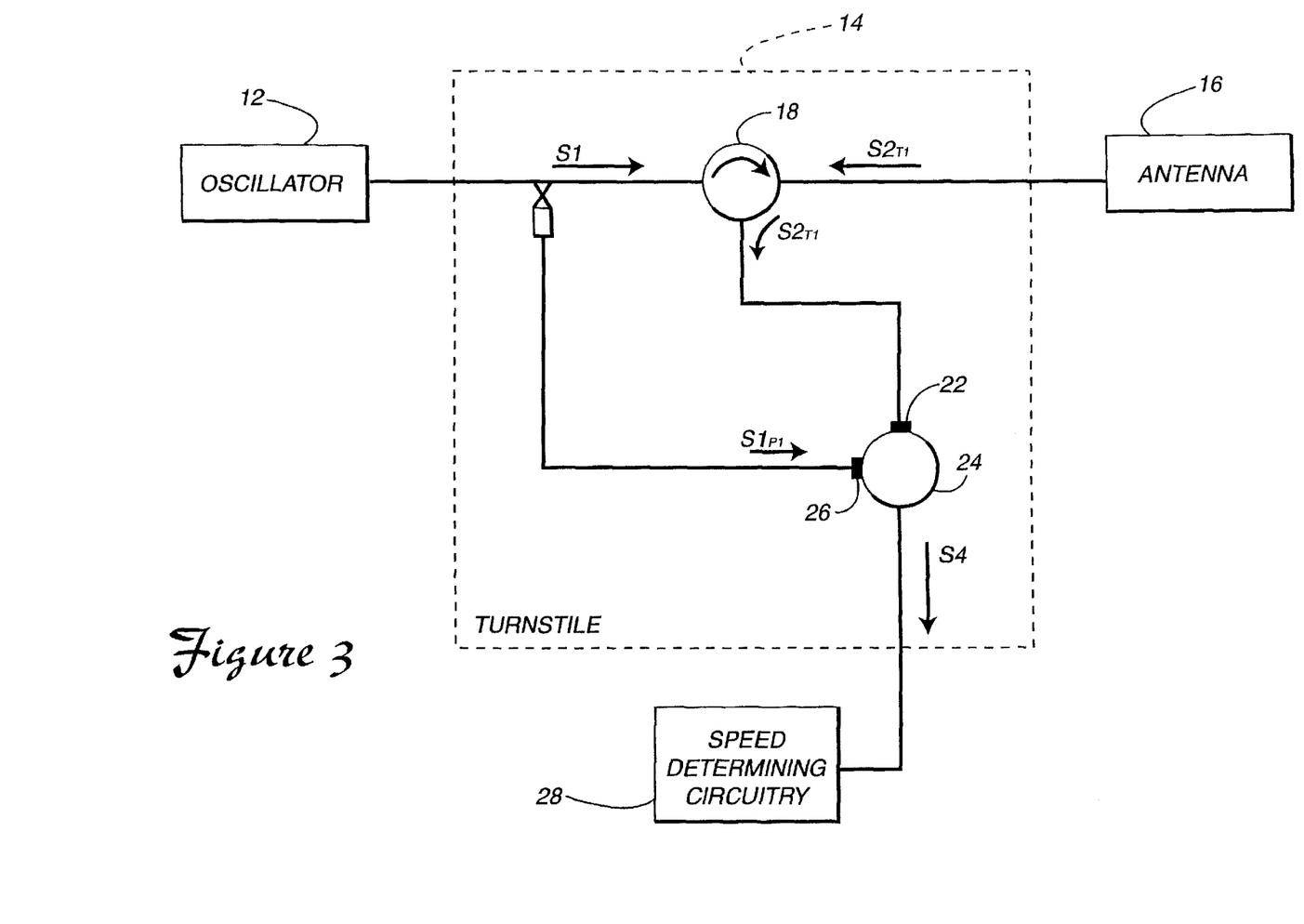
FIG. 3 is a detailed schematic block diagram of the turnstile of the present invention.
Figure 4:
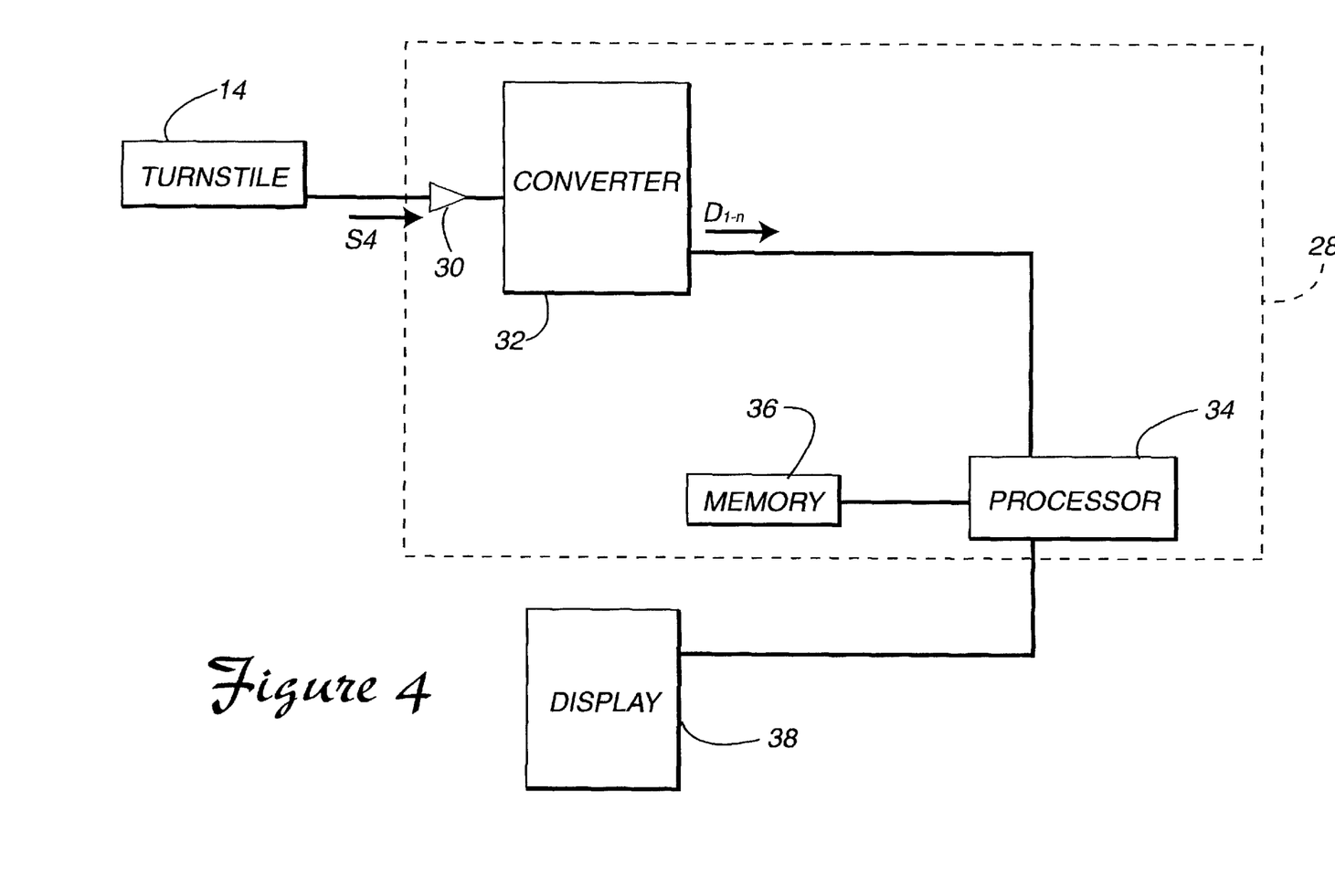
FIG. 4 is a schematic block diagram of the speed determining circuitry of the present invention.

As shown in FIG. 3, the reflected radar signal $S2_{T_1}$ is received by the antenna 16 and forwarded to a duplexer 18 in a manner well known in the art. The duplexer 18 isolates each reflected radar signal ($S2_{T_1}$, $S2_{T_2}$, ... $S2_{T_n}$) from the transmitted radar signal S1 and converts the linearly polarized signal to a circularly polarized signal. Also within the turnstile 14, the reflected radar signal $S2_{T_1}$ is directed to a first receive port 22 of a mixer 24, or mixer diode, where the reflected radar signal $S2_{T_1}$ is combined with a coupled portion of the transmitted radar signal $S1_{P_1}$ or leakage signal forwarded to a second receive port 26 of the mixer 24. The mixer 24 combines the signals to form a radar processing signal S4. The apparatus and methods of transmitting and receiving radar signals described in the three preceding paragraphs are considered to be basic principles which are well known in the art. As shown in FIG. 4, the resulting processing signal S4 is amplified by a preamplifier 30 and converted into digital samples $D_{1-n}$ by an analog-to-digital converter 32 for use by processor 34 in determining the speed of the target $T_1$.

Figure 5:
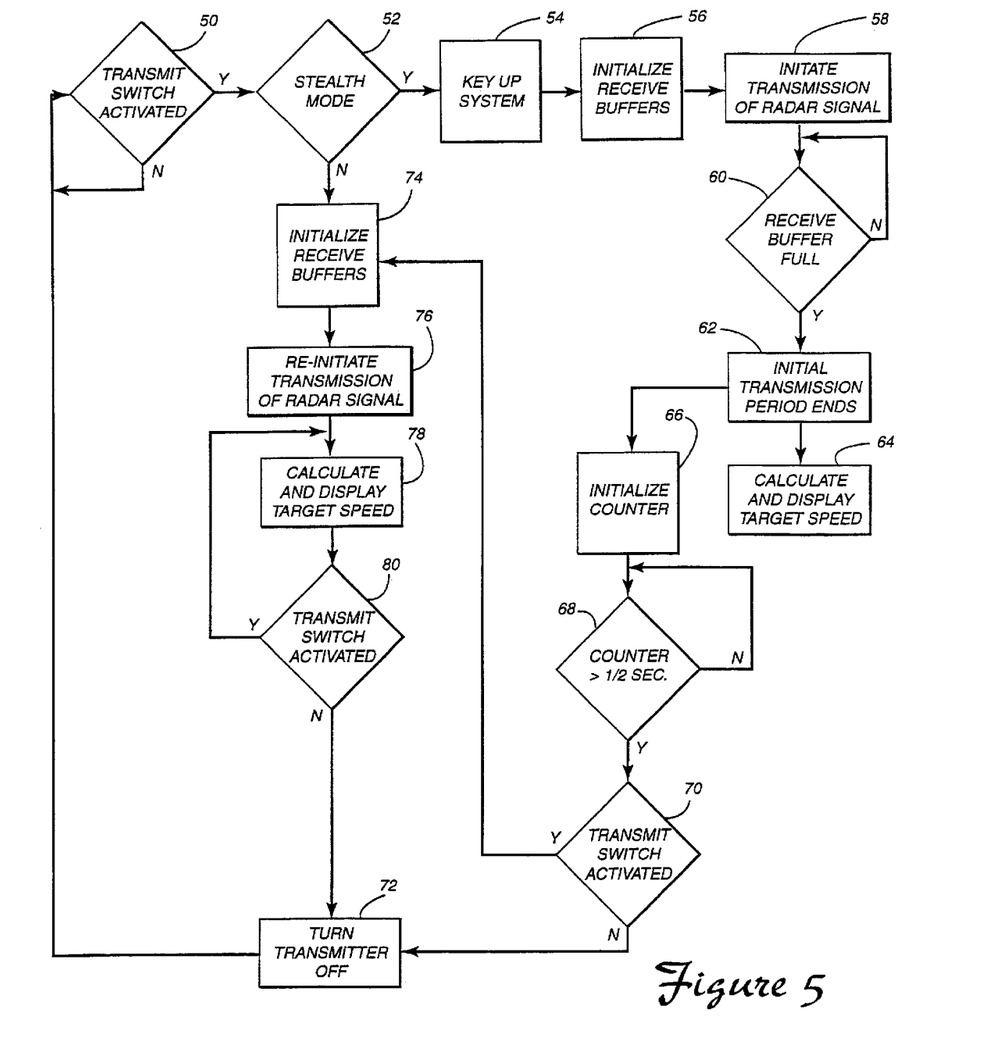
FIG. 5 is a flow chart of the control algorithm for the radar system.

As shown in the flow chart diagram of FIG. 5, transmission of the radar signal S1 represented by box 58 is manually activated by the radar system operator. Once the transmit switch or trigger (not shown) is activated in box 50, the radar system 10 determines the present mode of operation of the system in decision box 52. If the radar system 10 is in a stealth mode in accordance with the present invention, the oscillator 12 is keyed up and the receive buffers 36 initialized for receiving a predetermined number of reflected radar signal samples $D_{1-n}$. Once the oscillator 12 is keyed up and the receive buffers 36 are initialized, the transmitter begins transmitting a radar signal S1 represented by box 58. The digital samples $D_{1-n}$ are accumulated in the receive buffers 36 or memory for use in determining the speed of the target as indicated above for display in display 38. In accordance with the broad teachings of the present invention, the analog-to-digital conversion may alternately be accomplished in the processor 34 and the receive buffers 36 or memory may be internal to the processor 34 as is known in the art.

In the present preferred embodiment of the radar system 10, transmission of the radar signal S1 toward the moving target $T_1$ continues as monitored in box 60 until two-hundred and fifty-six samples $D_{1-256}$ are accumulated or buffered in memory 36 by processor 34. This accumulated group of samples $D_{1-256}$ is sufficient to determine the speed of the target $T_1$. The speed of the target $T_1$ however, may also be determined utilizing a lesser number of samples D although with less resolution as described further below.

The actual period of time required by the radar system 10 to accumulate a predetermined number of samples, for example the samples $D_{1-256}$, is dependent upon several factors including primarily the system hardware components, i.e., the processor or converter selected for use in the radar system 10. For example, the sampling rate of the present embodiment of the invention is determined and thus effectively limited by the system clock (not shown) which runs the processor 34 and triggers the analog-to-digital converter 32. Simply increasing the clock/processing speed necessarily reduces the period of time required to receive a radar signal $S2_{T_1}$ reflected from the moving target $T_1$ that is sufficient to determine the speed of the target. However, increasing the clock/processing speed also reduces the resolution of the signal $S2_{T_1}$. Therefore, radar system designers must balance these competing factors when designing a radar system in accordance with the teachings of the present invention. Of course, any combination of hardware components is acceptable so long as the transmit period $P_1$ remains less than the time period $P_2$ required for detection by commercial radar detectors.

Once the initial transmission of radar signal S1 ends as indicated at box 62 and dependent upon the mode of operation of the radar system 10, speed determining circuitry 28 is utilized as indicated in box 64 and shown in FIG. 4 to calculate the speed of the target $T_1$ for display to the radar system operator. In accordance with principles known in the art, the processor 34 transforms the digital samples $D_{1-256}$ from the time domain to the frequency domain to provide a frequency spectrum. More specifically, a digital signal processor 34 is utilized in the present preferred embodiment to perform a fast Fourier transform on the digital samples $D_{1-256}$. The resulting frequency spectrum of a time to frequency domain transformation necessarily includes a plurality of bins indicative of the Doppler components of the targets $T_1$, $T_2$ ... $T_n$. More specifically, the Doppler components include the amplitude and frequency of each target. During operation, the radar system 10 searches the Doppler components and selects a target according to an operating mode of the radar system. For example, in a strongest target mode of operation, the Doppler components are searched for a target having the highest amplitude which is subsequently displayed to the radar system operator by display 38. Similarly, in a fastest target mode of operation, the Doppler components are searched for a target having the highest frequency which is similarly displayed.

Dependent upon the displayed rate of speed, the radar system operator has the ability to halt further operation of the radar system 10 directed toward the selected target $T_1$ by releasing the transmit switch prior to an arbitrarily predetermined time period or to allow transmission of the radar signal S1 to be reinitiated by the radar system 10 for subsequently monitoring the speed of the target $T_1$ in order to provide a requisite Doppler audio signal and vehicle tracking history. In accordance with an important aspect of the present invention, the subsequent monitoring and tracking is accomplished in a one-step operation with no additional action required by the radar system operator.

More specifically, once the initial transmission period ends and the transmitter is turned off in box 62, a counter (not shown) is initialized in box 66 and begins counting a predetermined period of time as indicated in box 68. After the predetermined period of time, preferably between one-eighth and one second, and most preferably around one half second, the radar transmitter is turned back on if the transmit switch remains activated as indicated in decision box 70. The exact time period is not at all critical so long as the radar system 10 has a sufficient amount of time to calculate and display the speed of the target $T_1$ and the radar system operator can determine whether to continue monitoring the selected target $T_1$. If the transmit switch is not activated at the end of the period of time, the transmitter remains in a dormant state indicated in box 72 and the radar system 10 returns to a stand by mode indicated in box 50.

If, on the other hand, the transmit switch remains activated, the receive buffers 36 are re-initialized as indicated in box 74 and the transmitter 16 reinitiates transmission of a radar signal as indicated in box 76. In the present preferred embodiment, the re-initialization of the receive buffers 36 includes establishing the buffers to receive 1024 digital samples of the subsequently reflected radar signals. As indicated in boxes 78 and 80, the radar system 10 continues to transmit the radar signal and calculate and display the speed of the target $T_1$ as long as the transmit switch remains activated. Once the switch is released, the transmitter is turned off in box 72 and the radar system 10 returned to a stand by mode in box 50.

Figure 6:
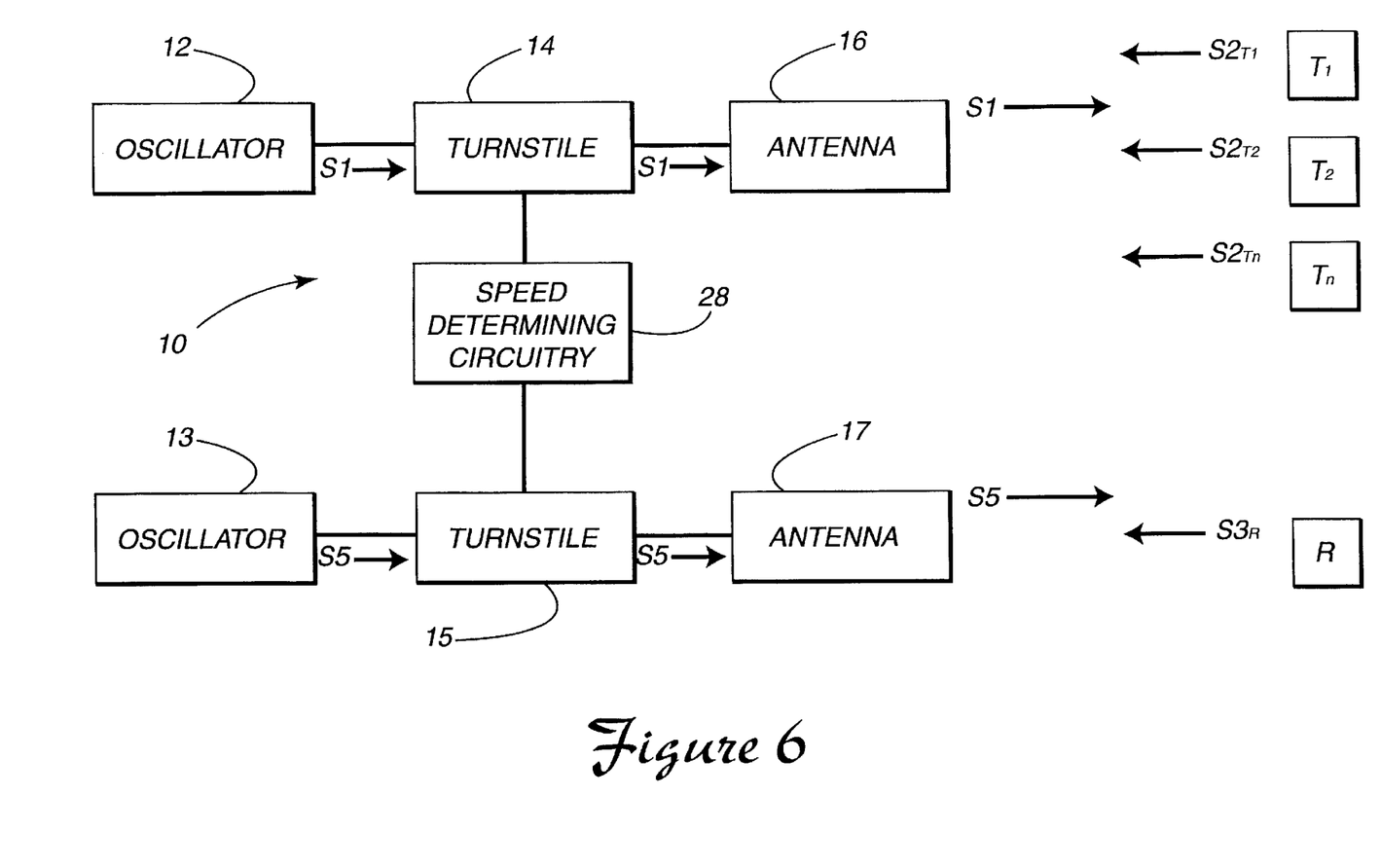
FIG. 6 is an overall schematic block diagram of an alternate embodiment of the Doppler-based radar system of the present invention.

In an alternate embodiment of the present invention, as shown in FIG. 6, a second oscillator 13, turnstile 15, and antenna 17 may be utilized to obtain the speed of the platform supporting the radar system 10. In the alternate embodiment, the second antenna 17 is directed away from the oncoming targets $T_1$ in order to avoid detection. In this manner, the speed of the platform can be determined on a continuous basis, if desired, independent of the mode of operation of the radar system 10.

In summary, the overall flexibility afforded a radar system operator and utility of the Doppler-based traffic radar system 10 of the present invention are significantly enhanced. This improvement is accomplished by controlling or limiting the duration of the initial radar signal transmission period such that presently available commercial radar detectors are substantially unable to detect and/or elect not to report the presence of the signal S1. Specifically, the radar system 10 is adapted to accumulate a predetermined number of digital samples D. Upon receipt of a sufficient number of samples $D_{1-n}$ obtained from the reflected radar signal $S2_{T_1}$ to determine the speed of the target $T_1$, the radar system 10 ends the initial transmission of the radar signal S1. Once the samples $D_{1-n}$ are accumulated, the radar system 10 determines the speed of the target $T_1$ and displays the speed in accordance with principles generally known in the art.

The foregoing description of a preferred embodiment of the invention has not been presented to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for determining a speed of a moving target from a platform having a traffic radar system while substantially eliminating the possibility of detection by an operator of the target utilizing a traffic radar detector comprising the steps of:
   transmitting a radar signal from the platform toward the moving target for a controlled period of time;
   receiving a portion of said radar signal reflected from the moving target;
   calculating the speed of the moving target;
   displaying the speed of the moving target; and
   ending the transmission of said radar signal at the end of said controlled period of time, said controlled period of time being substantially no longer than twenty-five milliseconds to avoid detection by the operator of the target but sufficiently long in duration to support said calculating step.

2. A method for determining a speed of a moving target from a platform having a traffic radar system comprising the steps of:
   initiating transmission of a radar signal from the platform toward the moving target;
   receiving a portion of said radar signal reflected from the moving target;
   monitoring an amount of the reflected radar signal received by the traffic radar system;
   ending the transmission of said radar signal upon receiving a sufficient amount of the reflected radar signal to calculate the speed of the moving target;
   calculating the speed of the moving target; and
   displaying the speed of the moving target.

3. The method of claim 2, wherein the transmission of said radar signal is initiated through actuation of a switch;
   monitoring said switch;
   re-initiating transmission of said radar signal dependent upon said monitoring step;
   receiving a portion of said radar signal reflected from the moving target following said re-initiating step; and
   calculating and displaying the speed of the moving target.

4. The method of claim 2, wherein the reflected radar signal portion includes a signal reflected from a stationary object, said stationary object signal indicative of a speed of the platform for use in said calculating step when the platform is moving.

5. The method of claim 2 further comprising the step of transmitting a platform transmit signal away from the moving target; and
   receiving a platform return signal reflected from a stationary object, said platform return signal indicative of a speed of the platform for use in said calculating step when the platform is moving.

6. The method of claim 2, wherein the transmission of said radar signal is ended after receiving a sufficient amount of the reflected radar signal to calculate the speed of the moving target but before detection by an operator of the moving target.

7. The method of claim 2, wherein a processor monitors the amount of the reflected radar signal received by the traffic radar system.

8. A method for determining the speed of a moving target from a platform having a traffic radar system while substantially eliminating the possibility of detection by an operator of the target utilizing a traffic radar detector comprising the steps of:
   actuating transmission of a radar signal;
   transmitting the radar signal from the platform toward the moving target;
   accumulating samples of a return signal reflected from the moving target sufficient to determine a speed of the moving target;
   limiting the duration of said transmitting step by monitoring the amount of the reflected return signal accumulated;
   calculating the speed of the moving target; and
   displaying the speed of the moving target,
   whereby the speed of the moving target is determined without alerting the operator of the moving target.

9. The method as claimed in claim 8 wherein the number of accumulated samples sufficient to determine the speed of the moving target is substantially two-hundred and fifty-six.

10. The method as claimed in claim 8 wherein the number of accumulated samples sufficient to determine the speed of the moving target is substantially one-hundred and twenty-eight.

11. The method as claimed in claim 8 further comprising the steps of monitoring the actuation of the radar signal;
   reinitiating the transmission of the radar signal from the platform toward the moving target dependent upon said monitoring step; and receiving a portion of the reinitiated radar signal reflected from the moving target; and calculating the speed of the moving target based on the reinitiated reflected radar signal portion, whereby the speed of the moving target is tracked in a manner sufficient to support a citation.

12. The method as claimed in claim 8 wherein the reflected radar signal portion includes a signal reflected from a stationary object, said signal indicative of a speed of the platform for use in said calculating step when the platform is moving.

13. The method as claimed in claim 12 further comprising the step of transmitting a platform transmit signal away from the moving target; and receiving a platform return signal reflected from a stationary object, said platform return signal indicative of a speed of the platform for use in said calculating step when the platform is moving.

14. A Doppler-based radar system for determining a speed of a moving target from a platform while substantially eliminating the possibility of detection by a traffic radar detector associated with the moving target comprising:

an oscillator to generate a signal;

an antenna to transmit the oscillator signal toward the target for a limited period of time and to receive a return signal reflected from the target;

speed determining circuitry for accumulating a predetermined amount of the received return signal sufficient to calculate the speed of the target and for calculating the speed of the moving target; and wherein said limited period of time ends upon the accumulation of the predetermined amount of the return signal, whereby the speed of the moving target is determined without alerting the operator of the moving target.

15. The radar system of claim 14 further comprising a switch for actuating transmission of the oscillator signal; and wherein said speed determining circuitry includes a processor for accumulating the predetermined amount of the received signal and placing said oscillator and said antenna in a stand by mode of operation at the end of the limited period of time.

16. The radar system of claim 15 wherein said processor includes a receive buffer initialized to receive substantially two-hundred fifty-six samples of the return signal; and wherein the receipt of said samples indicates the end of said limited period of time.

17. The radar system of claim 15 wherein said processor includes a receive buffer initialized to receive substantially one-hundred twenty-eight samples of the return signal; and wherein the receipt of said samples indicates the end of said limited period of time.

18. The radar system of claim 14 wherein said speed determining circuitry includes a counter for determining the limited period of time.

19. The radar system of claim 14, wherein said limited period of time is substantially no more than fifty milliseconds.

20. The radar system of claim 14, wherein said limited period of time is substantially no more than twenty-five milliseconds.

21. The radar system of claim 14, wherein said limited period of time is substantially no more than sixteen milliseconds.

22. The radar system of claim 14 further including a platform oscillator to generate a platform signal;

a platform antenna to transmit said platform oscillator signal away from the moving target and to receive a return platform signal reflected from a stationary object, said platform return signal indicative of a speed of the platform for use in determining the speed of the moving target when the platform is moving.

23. A method for determining a speed of a moving target from a platform having a traffic radar system while substantially eliminating the possibility of detection by an operator of the target utilizing a traffic radar detector comprising the steps of:

transmitting a radar signal from the platform toward the moving target for a controlled period of time;

receiving a portion of said radar signal reflected from the moving target;

calculating the speed of the moving target;

displaying the speed of the moving target; and ending the transmission of said radar signal at the end of said controlled period of time, said controlled period of time being substantially no longer than sixteen milliseconds to avoid detection by the operator of the target but sufficiently long in duration to support said calculating step.

24. A method for determining a speed of a moving target from a platform having a traffic radar system while substantially eliminating the possibility of detection by an operator of the target utilizing a traffic radar detector comprising the steps of:

transmitting a radar signal from the platform toward the moving target for a controlled period of time;

receiving a portion of said radar signal reflected from the moving target;

calculating the speed of the moving target;

displaying the speed of the moving target; and ending the transmission of said radar signal at the end of said controlled period of time, said controlled period of time being substantially no longer than twenty-five milliseconds to avoid detection by the operator of the target but sufficiently long in duration to support said calculating step;

monitoring the actuation of a switch used to initiate said transmitting step;

transmitting a second radar signal from the platform toward the moving target dependent upon said monitoring step;

receiving a portion of the second radar signal reflected from the moving target; and calculating and displaying the speed of the moving target based on the second reflected radar signal portion.

25. The method as claimed in claim 24 wherein the reflected radar signal portion includes a signal reflected from a stationary object, said signal indicative of a speed of the platform for use in said calculating step when the platform is moving.

26. The method as claimed in claim 25 further comprising the step of transmitting a platform transmit signal away from the moving target; and receiving a platform return signal reflected from a stationary object, said platform return signal indicative of a speed of the platform for use in said calculating step when the platform is moving.

* * * * *